US012605714B2

(12) United States Patent
Marik et al.

(10) Patent No.: US 12,605,714 B2
(45) Date of Patent: Apr. 21, 2026

(54) METHOD AND DEVICE FOR MIXING AND TEMPERATURE-CONTROLLING LIQUID MEDIA

(71) Applicant: Meon Medical Solutions Gmbh & Co KG, Graz (AT)

(72) Inventors: Reinhard Marik, Graz (AT); Arnold Bartel, Graz (AT)

(73) Assignee: Meon Medical Solutions Gmbh & Co KG, Graz (AT)

( * ) Notice: Subject to any disclaimer, the term of this patent is extended or adjusted under 35 U.S.C. 154(b) by 1066 days.

(21) Appl. No.: 17/260,199

(22) PCT Filed: Jul. 11, 2019

(86) PCT No.: PCT/AT2019/060231
§ 371 (c)(1),
(2) Date: Jan. 13, 2021

(87) PCT Pub. No.: WO2020/010380
PCT Pub. Date: Jan. 16, 2020

(65) Prior Publication Data

US 2021/0268507 A1 Sep. 2, 2021

(30) Foreign Application Priority Data

Jul. 13, 2018 (AT) .............................. A 50605/2018

(51) Int. Cl.
*B01L 7/00* (2006.01)
*B01L 3/00* (2006.01)

(52) U.S. Cl.
CPC ............. *B01L 7/00* (2013.01); *B01L 3/50255* (2013.01); *B01L 2300/0861* (2013.01); *B01L 2300/1822* (2013.01); *B01L 2400/0439* (2013.01)

(58) Field of Classification Search
CPC ................... B01L 7/00; B01L 3/50255; B01L 2300/0861; B01L 2300/1822; B01L 2400/0439
USPC ....................................................... 435/287.2
See application file for complete search history.

(56) References Cited

U.S. PATENT DOCUMENTS

| | | | | |
|---|---|---|---|---|
| 2006/0121603 A1* | 6/2006 | Yuan | C12M 47/06 | 435/306.1 |
| 2009/0092518 A1* | 4/2009 | Murakami | B01F 35/2115 | 366/116 |

FOREIGN PATENT DOCUMENTS

| | | | |
|---|---|---|---|
| DE | 2726498 | A1 | 12/1978 |
| EP | 1128185 | A2 | 8/2002 |
| EP | 2275823 | A1 | 1/2011 |
| JP | 2007010345 | A | 1/2007 |

(Continued)

*Primary Examiner* — Jill A Warden
*Assistant Examiner* — Jacqueline Brazin
(74) *Attorney, Agent, or Firm* — Dykema Gossett PLLC

(57) ABSTRACT

Aspects of the present disclosure are directed to devices and methods for mixing and controlling the temperature of liquid media which are introduced into lined-up cuvettes of a cuvette array in order to determine analytes. In some devices consistent with the present disclosure, the device may include a cuvette block with form-fitting receptacles for the cuvettes, said cuvette block being regulated to a predefinable block temperature. The cuvette block is equipped with a temperature control device and is in thermal contact with the individual cuvettes, wherein at least one ultrasonic transducer is attached to each cuvette in order to introduce ultrasonic energy into the cuvettes.

17 Claims, 5 Drawing Sheets

(56) References Cited

FOREIGN PATENT DOCUMENTS

| | | | | |
|---|---|---|---|---|
| JP | 2007248252 | A | | 9/2007 |
| JP | 2007303964 | A | | 11/2007 |
| JP | 2009210483 | | * | 9/2008 |
| JP | 2009210483 | A | | 9/2009 |

* cited by examiner

METHOD AND DEVICE FOR MIXING AND TEMPERATURE-CONTROLLING LIQUID MEDIA

CROSS-REFERENCE TO RELATED APPLICATIONS

This application is a national stage filing based upon International application No. PCT/ΔT2019/060231, filed 11 Jul. 2019, which claims the benefit of priority to Austria application No. A 50605/2018, filed 13 Jul. 2018.

BACKGROUND

The invention relates to a method and a device for mixing and controlling the temperature of liquid media which are introduced into lined-up cuvettes of a cuvette array in order to determine analytes, wherein the cuvettes of the cuvette array are arranged in a form-fitting manner in receptacles of a cuvette block which is temperature-controlled to a block temperature.

Analyses are routinely carried out in clinical diagnostics, analytics and microbiology, where there is a need to be able to carry out a quick and precise determination of particular properties and ingredients (analytes) of liquid samples accurately and reproducibly, in particular using optical methods.

To prepare for measuring analyte concentrations in a sample/reagent mixture located in a cuvette, for example by means of optical methods such as measuring the extinction, fluorescence, scattered light or luminescence, it is absolutely necessary in a first step to homogenize the sample/reagent mixture by circulating or stirring, while in a second step the sample/reagent mixture must be brought to a target temperature that is stabilized to within approximately 0.1° C. When analyzing biological samples, in particular when analyzing body fluids such as blood, blood plasma, urine and cerebrospinal fluid, a temperature between 25 and 42° C., preferably between 36.5 and 37.5° C. is desired, which is constantly stabilized to within approximately 0.1° C. The kinetics of enzymatic and immunochemical detection reactions are particularly dependent on temperature, with the kinetics generally increasing as the temperature increases.

In order to achieve a high sample throughput, it is necessary to reach the respective target temperature, at which the measurement can begin, as quickly as possible. Overshooting of the target temperature when heating the liquid must imperatively be avoided due to the sensitivity of many samples, such as biological samples for example. Biological sample constituents such as proteins (for example albumin, globulins and enzymes) are constituents to be determined in blood plasma and urine for example, but these denature at an increasing rate when temperatures >40° C. are exceeded, while enzymes and antibodies are essential constituents of many reagents. In particular, local hotspots on hot vessel walls at high heat flux densities may lead to the denaturing of biological samples or reagents, even if the average temperature reached by the sample/reagent mixture does not reach a critical value. This would distort and render unusable the result of a measurement to be carried out on the analyte in the sample/reagent mixture.

There is also a need to control the temperature of the contents of multiple cuvettes, which are filled into an analysis device at different times, to the target temperature, it being advantageous if multiple cuvettes can be temperature-controlled by heat conduction from a block of highly thermally conductive material, the temperature of which is pre-controlled to a constant temperature, or a circulated heat carrier, without using a separate control loop, consisting of a temperature sensor, heating element and electronic control unit, for each cuvette.

For a better understanding of the invention, a few essential technical terms used in the present application will be defined in greater detail:

Controlling the Temperature of Liquid Media:

In the sense of the invention, controlling the temperature of liquid media encompasses both the heating of a sample/reagent mixture and of particle-containing media or mixtures (suspensions), including the stabilization of a target temperature that has been reached.

The "liquid media" to be temperature-controlled comprise aqueous, stirrable mixtures of a liquid sample (for example biological samples such as blood plasma, urine, cerebrospinal fluid, etc.) with one or more reagents. According to the invention, this comprises both homogeneous liquid media and heterogeneous liquid-liquid mixtures (dispersions) or liquid-solid mixtures (suspensions). In particular, the reagents used may be introduced into the mixture in the form of suspended magnetic beads, or for example in the form of colloidal latex particles.

Cuvette:

A cuvette in the sense of the present invention refers to a temperature-controllable vessel, which is closed on all sides and is open at the top, for holding sample liquids and reagent liquids and the resulting reaction mixtures and which is used to measure the reaction mixtures by means of photometric, turbidimetric and luminometric methods. A cuvette in the sense of the present invention has at least one window which is arranged in a side wall of the cuvette and which is transparent for the optical measurement method used, or is optically transparent as a whole.

Cuvette Array:

This denotes a plurality of lined-up cuvettes. If these are arranged in a stationary manner and are not moved during normal measurement operation, this can be referred to as a stationary cuvette array.

PRIOR ART

DE 27 26 498 A1 (HELLMA) discloses a temperature-controllable cuvette arrangement. As shown in FIG. 1*a* of the present application, a temperature-controllable cuvette block 55 is provided which has a plurality of receiving shafts 56, into which cuvettes 57 can be inserted. The cuvettes 57, which taper conically in the downward direction and have lateral measurement windows 58, are inserted with a form fit into a U-shaped adapter 59 which has good thermal conductivity and which thus establishes thermal contact with the cuvette block 55 via the walls 60 of the receiving shaft 56. The sample/reagent mixture in each of the cuvettes 57 can in each case be optically measured through a measurement channel 61 in the cuvette block 55.

The disadvantage here is that the temperature of the sample/reagent mixture heats up only slowly to the temperature of the cuvette block. It is thus more difficult to achieve a high sample throughput in an analyzer, since controlling the temperature always counts among the processes that take the most amount of time when analyzing a sample.

JP 2007-303964 A (OLYMPUS) discloses—as shown in FIG. 1*b* of the present application—a device for controlling the temperature of cuvettes 62 which are arranged in receptacles of a rotatable carousel 63. The device has a piezoelectric substrate 64 which is attached to the side wall of each cuvette 62 and on which there is integrated both an electrode structure of an interdigital transducer (IDT) as the ultrasonic transducer 65 and a temperature sensor 66 for non-invasively measuring the temperature of the cuvette contents. A temperature regulating unit 68 of a control unit 69, which is connected via sliding contacts 67, forms together with the driver unit 70 for the ultrasonic transducer 65 a control loop for controlling the temperature of a reaction mixture in the cuvette 62. The sample/reagent mixture is heated directly to the target temperature by absorbing ultrasonic energy.

The disadvantage here is that each cuvette 62 requires an adhesively bonded piezoelectric substrate 64 with an integrated temperature sensor 66, which must be brought into contact with an electronic regulating unit 68. In addition, the temperature measured on the substrate of the ultrasonic transducer 65 may be distorted by the intrinsic heating of the ultrasonic transducer and thus does not correspond to the temperature of the sample/reagent mixture in the cuvette 62.

Furthermore, the temperature sensor 66 is not in contact with the liquid, but rather can sense the temperature of the liquid only indirectly via the heat conduction of the vessel wall of the cuvette 62, as a result of which, particularly in the case of rapid heating of the liquid, which is necessary for a high sample throughput, the rise in temperature in the liquid cannot be measured with sufficient speed and accuracy to be able to rule out a lasting or transient exceeding of the target temperature by a value that is critical for the sample constituents. On the other hand, measuring the temperature in the liquid, for example by means of an immersion sensor, cannot be carried out without disadvantages, since this can lead to the entrainment of sample material into other cuvettes.

EP 1 995 597 A1 (OLYMPUS) discloses a device for stirring liquids in cuvettes 71 which—as shown in FIG. 1*c* of the present application—are arranged on a rotatable cuvette carousel 72, wherein a sound generator 73 (interdigital transducer (IDT)) for irradiating ultrasonic energy into the cuvette 71 is adhesively bonded to the side wall of each cuvette. According to EP 1 995 597 A1, however, various measures must be taken in order to limit an undesired increase in temperature of the cuvette contents caused by absorption of sound energy, and to prevent distortion of the analysis results due to thermal damage.

The sound generator 73 is used exclusively to mix and stir the cuvette contents, with the resulting heat input being undesirable. The heat input can be minimized by limiting the operating time, by modulating the amplitude, or by varying the operating frequency of the ultrasonic generator. According to a further measure for limiting the heat input, a dedicated Peltier element 76 can be applied directly to the substrate of the adhesively bonded sound generator 73 by means of an actuator 75 for each cuvette 71, in order to actively cool said sound generator during operation. The power of the Peltier element 76 is controlled via stored operating parameters, with no temperature measurement being provided on the Peltier element. The signal generator 77 for the sound generator 73 is actuated by a driver unit 78 of the control unit 74.

EP 1 995 597 A1 discloses neither a temperature control of the cuvette carousel nor a predetermined input of ultrasound into the cuvette in order to achieve a predefinable target temperature of the cuvette contents.

In order to control the mixing or stirring process more precisely, and to ensure that a harmful temperature value is not exceeded during stirring, according to one embodiment variant of EP 1 995 597 A1 a temperature measurement of the liquid may be carried out from above by means of a stationary infrared sensor, but this can be carried out in each case only on one particular cuvette, depending on the rotary position of the carousel, and not on multiple cuvettes of the carousel simultaneously. Furthermore, in the case of known infrared sensors, there is the disadvantage that, due to the measurement of long-wave infrared, these are able to measure only surface temperatures, which may differ from the actual bulk temperature and additionally may be distorted by a slight change in emissivity, for example due to variable meniscus formation or foam formation on the surface of the liquid.

Since a temperature measurement by means of the provided infrared sensor reflects the surface temperature of the liquid, the temperature of the liquid is detected only locally and therefore only with an accuracy that is insufficient for precise temperature control. As in the case of the aforementioned indirect liquid temperature measurement through the vessel wall (JP 2007-303964 A), measurement errors also occur here, which in a control loop for controlling the temperature of the liquid during the rapid heating of biological substances may lead to thermal damage above certain temperatures.

JP 2007-010345 A (OLYMPUS) describes an ultrasonic stirring device, by which the contents L of a cuvette 81 can be mixed. As shown in FIG. 1*d* of the present application, a piezoceramic ultrasonic generator (thickness-mode transducer 83) is adhesively bonded to the bottom 82 of the cuvette 81, wherein the shape and the material of the cuvette bottom forms an acoustic lens 84 for focusing the ultrasonic energy at the point F just below the liquid surface. The thickness-mode transducer 83 made of lead zirconate titanate ("sounding body") comprises a flat disk 85 with flat electrical contacting 86 on both sides, having a diameter which is larger than that of the cuvette bottom 82.

EP 1 128 185 A2 and EP 2 275 823 A1 (both HITACHI) each disclose automatic analyzers, the cuvettes of which are arranged in a temperature-controlled water bath of a cuvette carousel. Arranged at a position on the wall of the water bath is a stirring station in the form of a piezoelectric ultrasonic transducer, by means of which ultrasound can be radiated through the water bath and into the cuvette in order to stir the cuvette contents. The disadvantage here is that the individual cuvettes of the cuvette carousel must each be brought to the stirring station.

SUMMARY OF THE INVENTION

The object of the invention is to improve a method and a device for mixing and controlling the temperature of liquid media which are introduced into lined-up cuvettes of a cuvette array, such that the length of time between introducing the liquid media into the cuvette and reaching a predefined target temperature is shortened without there being any risk of thermal damage to the sample/reagent mixture. In addition, the sample/reagent mixture should be optimally mixed by the time the target temperature is reached.

This object is achieved according to the invention in that the device has a cuvette block with form-fitting receptacles for the cuvettes, said cuvette block being regulated to a predefinable block temperature, which cuvette block is equipped with a temperature control device and is in thermal contact with the individual cuvettes, in that at least one ultrasonic transducer is attached to each cuvette in order to introduce ultrasonic energy into the cuvettes, and in that the ultrasonic transducer is designed as a piezoelectric vibrator and is connected to a control unit which actuates the at least one ultrasonic transducer as a function of parameter values of the liquid media.

The method according to the invention for mixing and controlling the temperature of liquid media which are introduced into lined-up cuvettes of a cuvette array in order to determine analytes, wherein the cuvettes of the cuvette array are arranged in a form-fitting manner in receptacles of a cuvette block which is temperature-controlled to a block temperature, is characterized by the following steps:

a) heating the empty cuvettes to a predefinable target temperature of 25 to 42° C., preferably 36.5 to 37.5° C., by heat conduction from the temperature-controlled cuvette block, the block temperature $T_{BL}$ of which is 0.1 to 1° C., preferably 0.1 to 0.5° C., above the target temperature, b) adding one or more liquid media having a temperature lower than the target temperature into at least one of the cuvettes, wherein the liquid media in the cuvette have an initial temperature below the target temperature, c) heating the liquid media by means of the temperature-controlled cuvette block in order to reach the predefined target temperature, d) in the phase of heating by heat conduction according to point c), before the target temperature is reached, additionally introducing a predetermined quantity of ultrasonic energy by means of at least one ultrasonic transducer attached to (contacting) each cuvette in order to increase the rate of heating, and e) simultaneously mixing the liquid media by means of the ultrasonic energy introduced in point d).

According to the invention, therefore, thermal energy from two different heat sources is supplied to the cuvette contents. Besides the input of thermal energy by heat conduction (conductive input), a predetermined, non-conductive input of thermal energy takes place by means of ultrasound. Compared to the purely conductive input, therefore, the cuvette contents can thus be more rapidly heated to a precisely predefinable target temperature (without exceeding the target temperature), with the cuvette contents at the same time being mixed by the input of ultrasonic energy. The main input of thermal energy takes place by heat conduction, and a smaller input in relative terms takes place by means of ultrasound.

In point b), the addition of one or more liquid media preferably takes place once the cuvette block has reached the target temperature.

In particular, it is provided according to the invention that the quantity of ultrasonic energy introduced in point d) is determined as a function of parameter values of the liquid media added in point b), such as quantity, heat capacity, viscosity, thermal conductivity and temperature.

The quantity of ultrasonic energy to be introduced can be determined for example in a test step or calibration step at the factory by experimental measurements and/or calculations, with appropriate information then being made available to the user in the form of memory data or optically readable codes.

Once the calibration has been completed for all the intended analyte determinations, no measures are required by the user, during operation of the device for mixing and controlling the temperature of liquid media, to determine the required quantity of ultrasonic energy for the respective analyte determination, since it is possible to access the appropriate values from the test and calibration phase.

With the method according to the invention, any local hotspots occurring during rapid heating are effectively prevented since the introduction of ultrasonic energy is regulated by control codes, which are stored for example in an analysis protocol and have been determined as a function of parameter values of the liquid, such that the liquid in the cuvette is heated and is constantly circulated at the same time.

One significant advantage of the invention is therefore that, by parameterizing the quantity of ultrasonic energy introduced, the temperature of the cuvette contents can never be greater than that of the cuvette block, the temperature of which is pre-controlled to a final temperature that is compatible with the sample. As a result, thermal damage to biological samples and reagents due to hotspots or due to a brief exceeding of the target temperature can largely be ruled out.

From a technical standpoint, it is particularly simple and reliable to control the temperature of lined-up cuvettes by means of a cuvette block made of a continuous, thermally conductive material, such as for example a block of anodized aluminum. When heating the cuvette contents from a pre-temperature-controlled heat source, the block temperature $T_{BL}$ is typically approached asymptotically, so that the heating takes place rapidly at first, and then increasingly more slowly. Since the block temperature $T_{BL}$ is never quite reached, in the case of temperature control via a block a slightly lower temperature of $T_{BL-x}$ will be accepted as the target temperature, which is typically in the range of 0.1-1° C., preferably 0.1-0.5° C., below the block temperature when controlling the temperature of biological samples in the context of an optical measurement of particular analytes and may not vary by more than 0.1° C. during the measurement(s) in the context of the analysis (see FIGS. 5*a*, 5*b*).

According to the invention, the ultrasonic energy according to point d) may be introduced into the liquid media in a pulsed manner in multiple boosts.

In addition, it is advantageous if at least one boost of the ultrasonic energy introduced in point d) is optimized in terms of the pulse duration, the frequency and the amplitude in order to mix the liquid media in the cuvette.

In this case, a signal waveform which is advantageous for a combined mixing (by generating a convection in the liquid) and heating (by absorbing ultrasound into the liquid) can be selected, starting from a fundamental frequency of the ultrasonic transducer, which may be modulated by an impressed frequency that is lower in comparison. In addition, the amplitude of the fundamental frequency of the ultrasonic transducer may also be modulated by an impressed frequency that is lower in comparison, wherein the amplitude may be varied between a full modulation (100%) of the signal and switch-off of the signal (0%). An amplitude modulation with the amplitude ratio (100:0) would in this case correspond to a burst pattern. In both cases, modulation signal waveforms such as sine, square, sawtooth or the like can be used.

Particularly good results with regard to the mixing of the liquid media introduced into the cuvette can be achieved if the ultrasonic transducer is operated at a fundamental frequency of 200 kHz to 200 MHz, for example at approximately 0.5 MHz to 10 MHz when using a thickness-mode transducer, and at approximately 50 MHz to 150 MHz when using an interdigital transducer.

Preferably, a modulation frequency having an amplitude of 1 to 100 Hz is impressed on the fundamental frequency of the ultrasonic transducer.

For mixing and heating aqueous reagent liquids and sample liquids when carrying out analyses in corresponding cuvettes, the fundamental frequency of ultrasonic transducers which can be used with advantage depends on the type of ultrasonic transducer used. If use is being made of adhesively bonded thickness-mode transducers made of piezoceramic, fundamental frequencies of suitable type (depending on the size and dimension of the substrate) are between approximately 200 kHz and 10 MHz, preferably approximately 0.5 to 10 MHz. If use is being made of adhesively bonded interdigital transducers, fundamental frequencies of suitable type (depending on the size and dimension of the transducer, and also of the substrate) are approximately 10 to 200 MHz, preferably approximately 50-150 MHz.

The ultrasonic transducers may also be pressed against the individual cuvettes by means of a spring force.

BRIEF DESCRIPTION OF THE DRAWINGS

The invention will be explained in greater detail below on the basis of exemplary embodiments, which are partially schematic and in which.

The devices shown in FIGS. 1a to 1d for mixing and controlling the temperature of liquid media relate to examples from the prior art and have already been discussed at length in the introductory part of the description above.

Parts which have the same function are provided with the same reference signs in the individual embodiment variants of the invention.

DETAILED DESCRIPTION

Figure 1A:
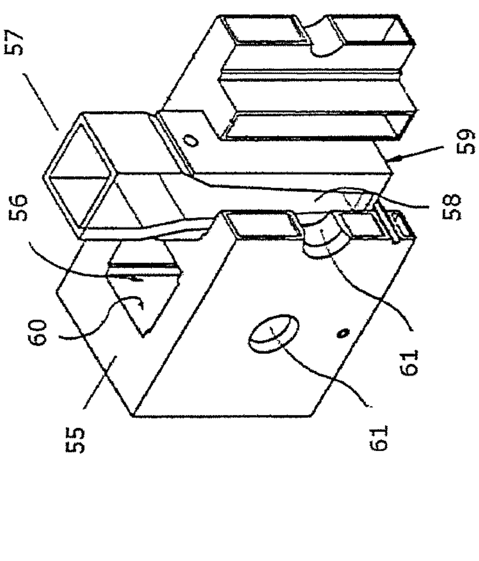
Fig. 1a (PRIOR ART)
FIG. 1a to FIG. 1d show different devices according to the prior art for mixing and controlling the temperature of liquid media.
Figure 1B:
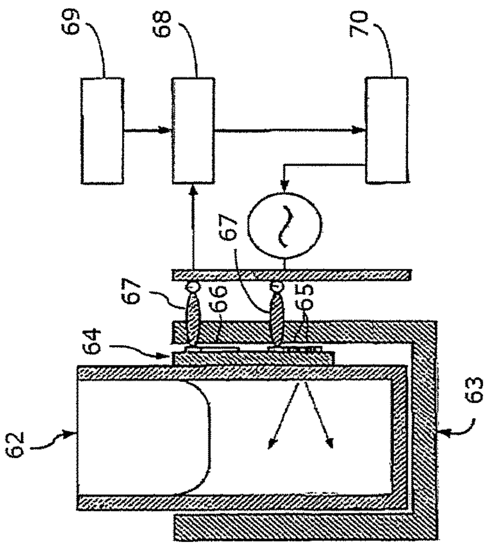
Fig. 1b (PRIOR ART)
Figure 1C:
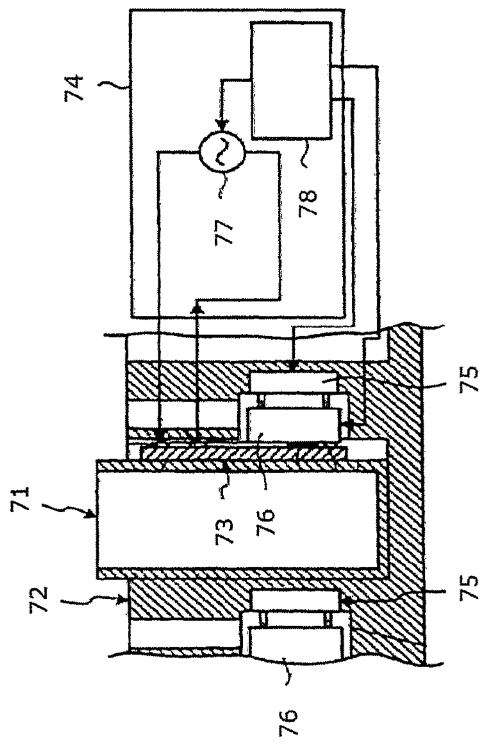
Fig. 1c (PRIOR ART)
Figure 1D:
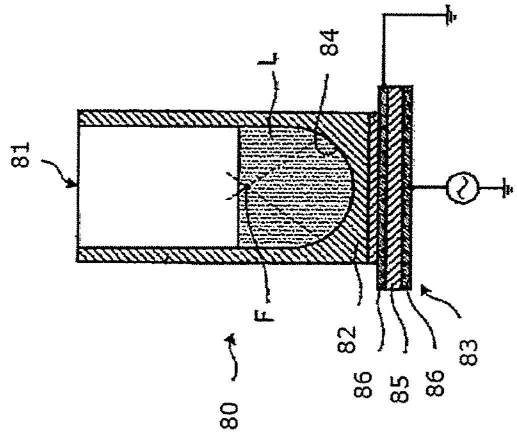
Fig. 1d (PRIOR ART)
Figure 2B:
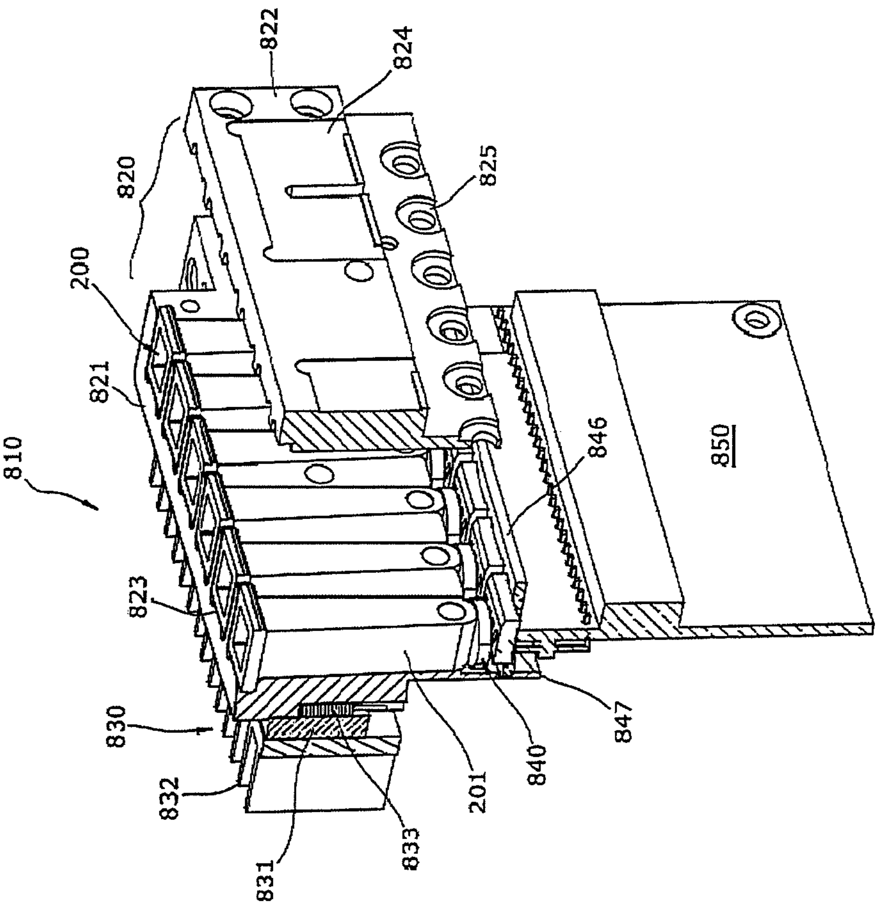
FIG. 2b shows the device according to FIG. 2a with the front part of the cuvette block detached.
Figure 2A:
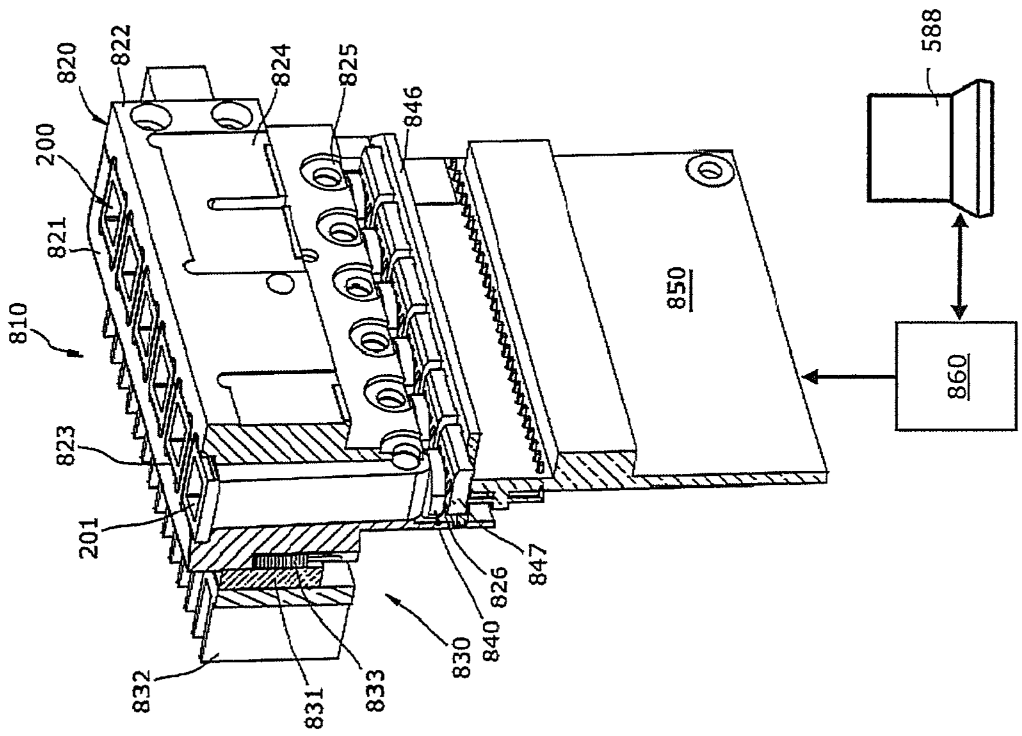
FIG. 2a shows a device according to the invention for mixing and controlling the temperature of liquid media, in a three-dimensional view.
Figure 3C:
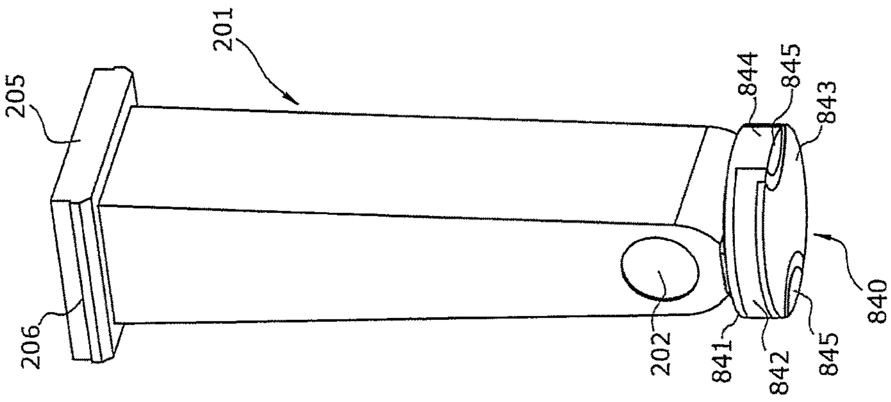
FIG. 3a shows the device according to FIG. 2a in a sectional view along the line III-III in FIG. 2a, FIG. 3b shows a sectional view of a cuvette and the vicinity thereof along the line IV-IV in FIG. 3a, FIG. 3c shows a cuvette together with the ultrasonic transducer of the device according to the invention shown in FIG. 2a, in a three-dimensional view.
Figure 3B:
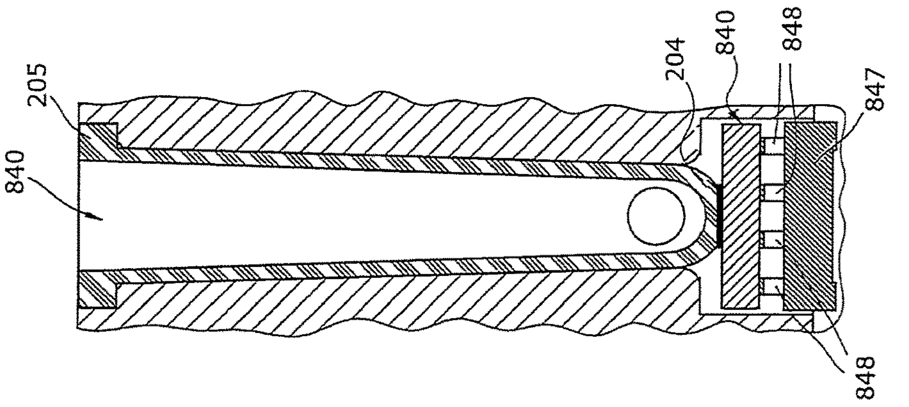
Figure 3A:
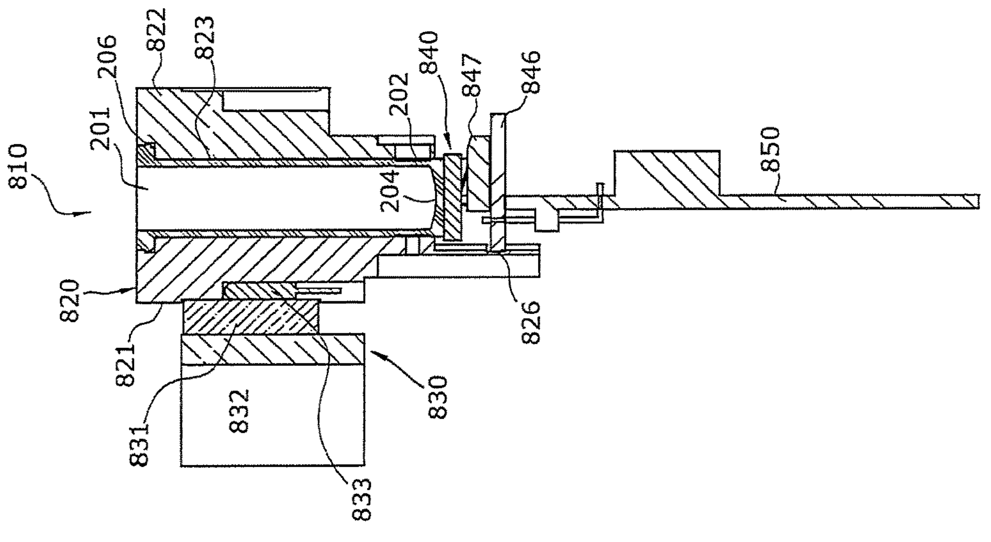

The device 810 shown in FIGS. 2a, 2b and 3a for mixing and controlling the temperature of liquid media is used to control the temperature of the liquid media introduced into the lined-up cuvettes 201 of a cuvette array 200. In the example shown, this is a linear, stationary cuvette array 200.

The individual cuvettes 201 of the cuvette array 200 are arranged in a temperature-controllable cuvette block 820, which has a high heat capacity compared to the cuvettes and is made of a highly thermally conductive material, for example of anodized aluminum, wherein the walls of the funnel-shaped receptacles 823 make form-fitting contact with the walls of the cuvettes 201 in the region of the lower cuvette half in a proportion of at least 10%, preferably at least 20%, in order to ensure optimal heat transfer. The cuvette block 820 consists of a base part 821, which contains the receptacles 823, and a detachable front part 822, wherein in FIG. 2b the cuvette block 820 is shown with the front part 822 detached.

A temperature control device 830 is arranged on the cuvette block 820, for example on the base part 821, said temperature control device having a cooling and heating device, for example in the form of one or more Peltier elements 831 and also cooling fins 832. In order to regulate the temperature of the cuvette block 830, a temperature sensor 833 is arranged in a receptacle between the base part 821 and the Peltier element 831.

On the detachable front part 822 of the cuvette block 820, it is possible to see connection surfaces 824, which can also be used to attach a cooling and heating device, for example Peltier elements. The front part 822 additionally has openings 825 corresponding to the measurement windows 202 of the cuvettes 201, in order to enable an optical measurement of the liquid media in the cuvettes 201.

An ultrasonic transducer 840, for example a thickness-mode transducer, is attached to the bottom 204 of each cuvette 201, for example by adhesive bonding or by being injection-molded therewith during manufacture of the cuvette, by which ultrasonic energy can be introduced into the cuvette 201. The ultrasonic energy introduced is used both for mixing the liquid media and also for targeted heating—in addition to the base load resulting from the temperature control by the cuvette block 820.

The ultrasonic transducer 840 is designed as a piezoelectric thickness-mode transducer which—as shown in detail in FIG. 3c—substantially consists of a disk-shaped piezoelectric element 842 and contact electrodes 841 and 843 arranged on both sides. The electrode 841 on the cuvette side is contacted with the lower electrode 843 via lateral contact strips 844 and forms crescent-shaped contact areas 845 at these locations.

For each cuvette 201 and the ultrasonic transducer 840 thereof, a contact block 847 supported by a spring contact board 846 is provided, said contact block having four contact springs 848, two of which contact the crescent-shaped contact areas 845 and two of which contact the lower contact electrode 843 of the ultrasonic transducer 840. The cuvette 201 has, at the filling opening 207, a collar 205 and also stop strips 206 on opposite sides, by which the cuvette 201 is held in the cuvette block 820 counter to the pressure of the contact springs 848.

The edge of the spring contact board 846 is inserted in a horizontally extending groove 826 of the cuvette block 820 and is supported against the downwardly projecting decoder board 850, the circuits of which will be explained in greater detail in FIG. 4.

Figure 4:
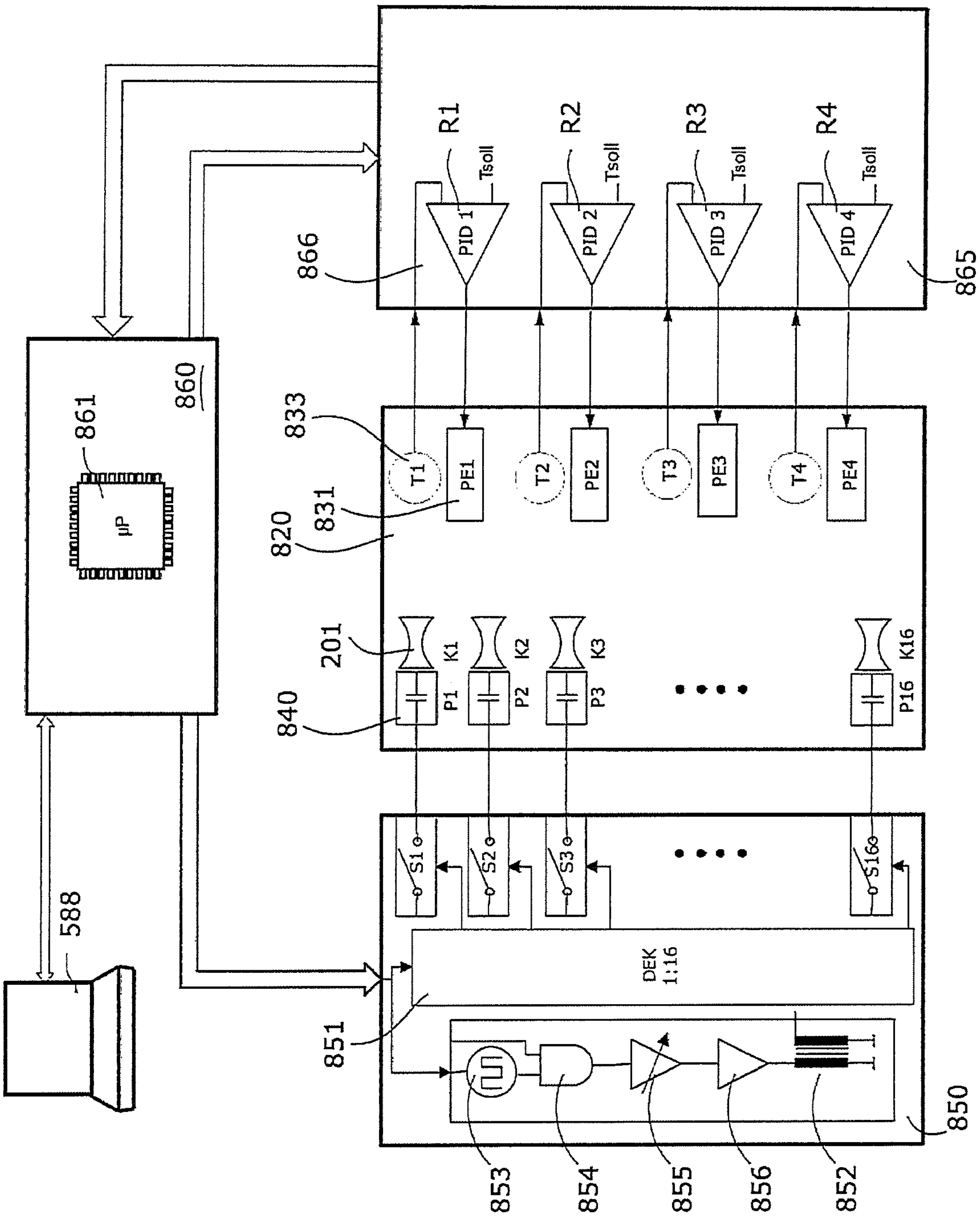
FIG. 4 shows a block diagram concerning the electronic actuation of the device for mixing and controlling the temperature of liquid media according to FIG. 2a, FIG. 5a shows a temperature diagram to illustrate a first exemplary embodiment of a temperature control and mixing process for a liquid.

FIG. 4 shows a block diagram concerning the electronic actuation of the device for mixing and controlling the temperature of liquid media according to FIG. 2a, said block diagram comprising the functional blocks personal computer 588, controller board 860, decoder board 850, cuvette block 820, and a temperature control circuit 865.

The controller board 860 has an FPGA (Field Programmable Gate Array) as the processor 861 and serves to control the decoder board 850 and also the temperature control circuit 865. The personal computer 588 may be connected to the controller board 860, for example via an Ethernet interface, and depending on the mixing and temperature control task to be performed in one of the cuvettes 201 of the cuvette block 820 transmits appropriate instructions to run firmware programs on the controller board 860, and also serves for the return transmission of monitoring data, such as the measured temperatures for example, for controlling the temperature of the cuvette block 820.

Cuvettes 201 together with the associated ultrasonic transducers 840 are arranged in the cuvette block 820, respectively at the positions K1 to K16 and P1 to P16, wherein in the example shown, for temperature control purposes, a respective Peltier element 831 together with the associated temperature sensor 833 is provided in the positions PE1 to PE4 and T1 to T4.

The temperature control circuit 865 thus has four temperature control loops 866, each consisting of a Peltier element 831, a temperature sensor 833 and a PID (Proportional, Integral, Derivative) controller R1 to R4, and is connected via an interface to the controller board 860 for data exchange purposes (receiving parameters such as temperature setpoints and sending back measured temperatures from the temperature control circuit 865 to the controller board 860).

The decoder board 850 is likewise connected via an interface to the controller board 860 and receives from the latter control signals for selecting individual ultrasonic transducers 840 via the decoder circuit 851 implemented on the decoder board 850 and the associated optical switches in the positions S1 to S16, as well as control signals for parameterizing the oscillator circuit 852. The oscillator circuit 852 receives control signals for adapting the frequency, duty cycle, burst pattern, amplitude, phase, and ON and OFF states of the signal generation of the oscillator. The oscillator circuit 852 comprises a voltage-controlled oscillator 853 (VCO), the frequency signal of which can be modulated via a burst generator 854. The amplitude of the modulated signal can additionally be adapted via a controllable preamplifier 855 and also a downstream amplifier output stage 856. The final amplified signal is stepped up by a transformer to the required operating voltage of the ultrasonic transducers 840 and is fed to one of the 16 piezoelectric ultrasonic transducers 840 on the cuvettes 201 on the cuvette block 820 via the respective optical switch 857 in S1 to S16 respectively selected by the decoder circuit 851. The diagram in FIG. 5*a* shows a first example of a process according to the invention for controlling the temperature of a sample/reagent mixture in a cuvette which is arranged in a temperature-controllable cuvette block (see FIGS. 2*a*, 2*b*).

The temperature curve a shows the heating of the sample/reagent mixture only by the cuvette block controlled to the temperature $T_{BL}$, wherein the target temperature (which is a temperature $T_{BL-x}$ slightly below the temperature $T_{BL}$), at which the sample/reagent mixture can be measured, is not reached until the time $t_2$. If ultrasonic boosts are introduced in the time periods M and A to C, the required target temperature is reached much earlier, at the time $t_1$, as shown in the temperature curve B. The temperature of the cuvette block is controlled using a substantially constant electric power $P_{BL}$.

1) Preheating the empty cuvettes to a predefinable target temperature of 36.5 to 37.5° C. by means of the temperature-controlled cuvette block, the block temperature $T_{BL}$ of which is 0.1 to 1° C. above the target temperature, and stabilizing the block temperature with an accuracy of 0.1° C.
2) Filling an empty cuvette with a sample/reagent mixture of initial temperature $T_0$. For example, after being pipetted into the cuvette, the sample/reagent mixture has an initial temperature of 10-15° C. if the pipetted reagents come from a storage area that is cooled to 5° C. and heat up to 10-15° C. in the pipettor and in the supply lines.
3) Emitting an ultrasonic signal for a predefined cumulative mixing duration M, which, in the case of an ultrasonic signal having the average electric power $P_P$, introduces a quantity of energy $M \times P_P$ into the sample/reagent mixture and brings about a calculated change in temperature $\Delta T_M$, this being calculated from variable properties of the sample/reagent mixture which are known from the data of the analysis to be carried out, such as heat capacity, viscosity, thermal conductivity, and also the volume thereof, and constant data stored in the device. The quantity of energy introduced in the mixing duration M is enough to mix the sample/reagent mixture sufficiently.

Depending on the stirring task, the cumulative duration of the stirring processes required in order to mix the reagents is typically from 1 to 3 seconds, wherein the change in temperature $\Delta T_M$ of a 2-second stirring pulse for example may be approximately 3° C., depending on the intensity.

Alternatively, for a given ultrasonic power $P_P$, the mixing duration M that is necessary in order to obtain a stable measurement signal or incubation process can be determined by experiments on different sample/reagent mixtures and can be stored in the device.

As another alternative method, an optical signal of an analyte measurement can be continuously measured from the sample/reagent mixture and the mixing process can be terminated as soon as a stable signal is obtained, wherein the change in temperature $\Delta T_M$ in this case is calculated—as mentioned—from known thermal characteristics.

4) Observing a pause >0.5 s, for example in order to cool the bottom of the cuvette and optionally a site of adhesion to the ultrasonic transducer.
5) Emitting one or more ultrasonic signals, optionally interrupted by pauses >0.5 s, at a calculated temperature $T_A$ for a predefined cumulative duration A+B+C+n, which corresponds to an additional calculated change in temperature $\Delta T_A+\Delta T_B+\Delta T_C+\Delta T_n$, wherein, after the last ultrasonic pulse has been emitted, a temperature $T_{BL-y}$ is reached which is just below (<5° C., preferably <2° C.) the target temperature $T_{BL-x}$. Due to the lack of real-time temperature data, the temperature $T_{BL-y}$ is computer-estimated from the temperature difference to be expected, and depending on the operating scenario is subject to a prediction inaccuracy of one or more ® C., which is why $T_{BL-y}$ is accordingly set below the desired target temperature $T_{BL-x}$. Above this temperature, the temperature input into the cuvette contents takes place purely by heat conduction between the cuvette block 820 and the cuvette contents.
6) Reaching a target temperature $T_{BL-x}$ which is lower than the temperature of the cuvette block by the value x, where x is for example at a specified value of 0.1-1° C., preferably 0.1-0.5° C. The target temperature is fixed, and in the example shown is between 36.5 and 37.5° C. The temperature constancy throughout the duration of a subsequent optical measurement of an analyte concentration should be around 0.1°° C.

Figure 5B:
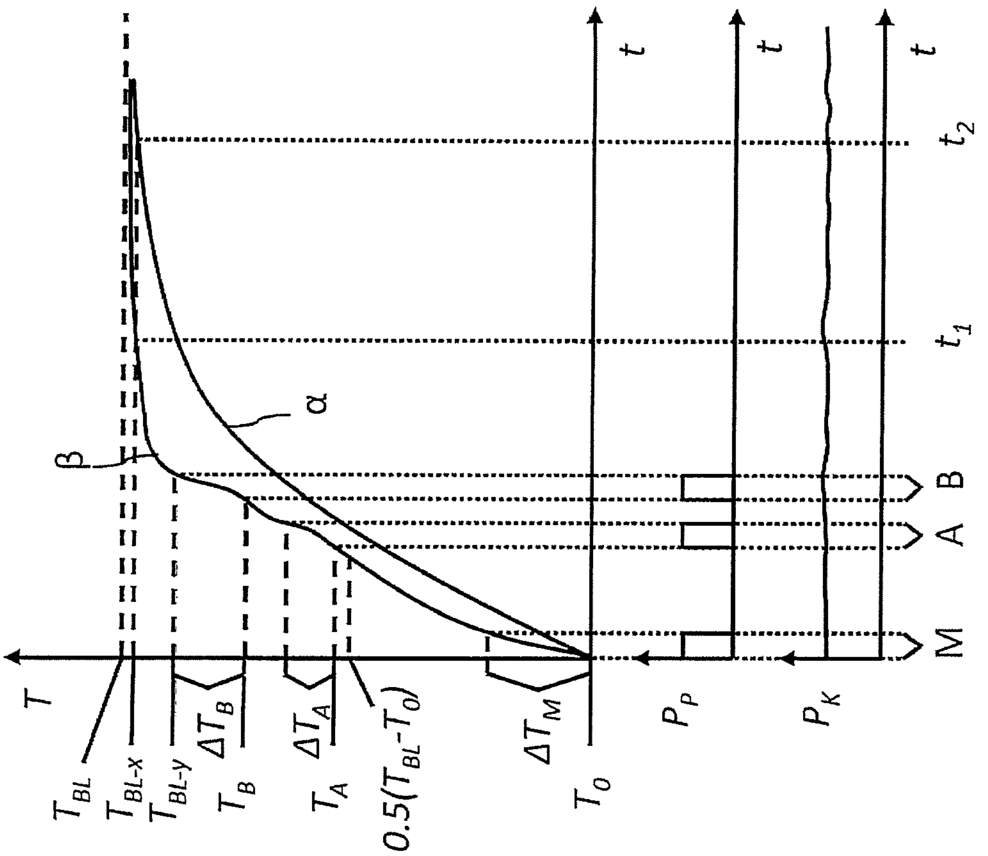
FIG. 5b shows a temperature diagram to illustrate a second exemplary embodiment of a temperature control and mixing process for a liquid.
Figure 5A:
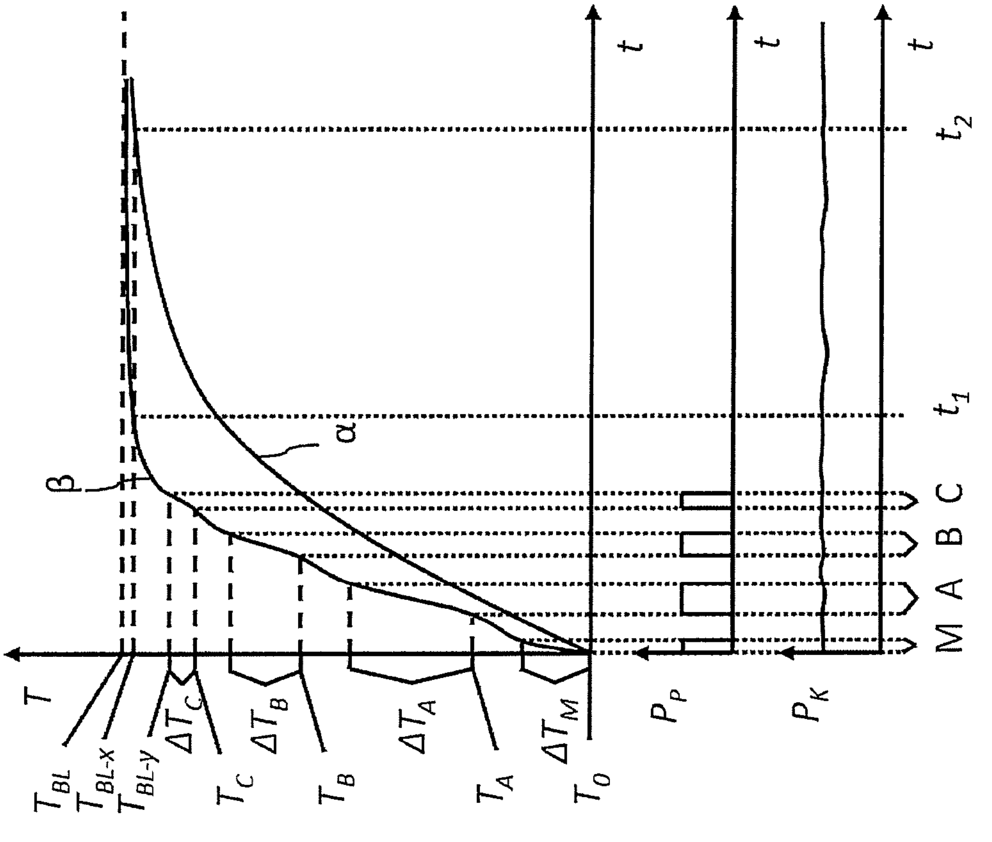

The diagram in FIG. 5*b* shows a second example of a process according to the invention for controlling the temperature of a sample/reagent mixture in a cuvette which is arranged in a temperature-controllable cuvette block (see FIGS. 2*a*, 2*b*).

1) (as example 1) Preheating the empty cuvettes to a predefinable target temperature of 36.5 to 37.5° C. by means of the temperature-controlled cuvette block, the block temperature $T_{BL}$ of which is 0.1 to 1° C. above the target temperature, and stabilizing the block temperature with an accuracy of 0.1° C.

2) (as example 1) Filling an empty cuvette with a sample/reagent mixture which has an initial temperature $T_0$. For example, after being pipetted into the cuvette, the sample/reagent mixture has an initial temperature of 10-15° C. if the pipetted reagents come from a storage area that is cooled to 5° C.

3) (as example 1) Emitting an ultrasonic signal for a predefined cumulative mixing duration M, which, in the case of an ultrasonic signal having the average electric power $P_P$, introduces a quantity of energy $M \times P_P$ into the sample/reagent mixture and brings about a calculated change in temperature $\Delta T_M$, this being calculated from variable properties of the sample/reagent mixture which are known from the data of the analysis to be carried out, such as heat capacity, viscosity, thermal conductivity, and also the volume thereof, and constant data stored in the device.

Depending on the stirring task, the cumulative duration of the stirring processes required in order to mix the reagents is typically from 1 to 3 seconds, wherein the change in temperature $\Delta T_M$ of a 2-second mixing pulse for example may be approximately 3° C., depending on the intensity.

Alternatively, for a given ultrasonic power $P_P$, the mixing duration M that is necessary in order to obtain a stable measurement signal or a washing or incubation process can be determined by experiments on different sample/reagent mixtures and can be stored in the device.

As another alternative method, an optical signal can be continuously measured from the sample/reagent mixture, for example a signal that correlates with an analyte concentration, and the mixing process can be terminated as soon as a stable signal is obtained, wherein the change in temperature $\Delta T_M$ in this case is calculated—as mentioned—from known thermal characteristics.

4) (as example 1) Observing a pause >0.5 s, for example in order to cool the bottom of the cuvette and optionally a site of adhesion to the ultrasonic transducer.

5) Emitting one or more ultrasonic signals, optionally interrupted by pauses >0.5 s, at a calculated temperature $0.5 \times (T_{BL} - T_0)$ for a predefined cumulative duration A+B+n, which corresponds to an additional calculated change in temperature $\Delta T_A + \Delta T_B + \Delta T_n$, wherein, after the last ultrasonic pulse has been emitted, a temperature $T_{BL-y}$ is reached which is just below (<5° C., preferably <2° C.) the target temperature $T_{BL-x}$.

It is particularly advantageous if a proportion of at least 30%, preferably more than 50%, of the total quantity of ultrasonic energy introduced during the heating is introduced above a calculated temperature $T = 0.5 \times (T_{BL} - T_0)$.

Due to the lack of real-time temperature data, the temperature $T_{BL-y}$ is computer-estimated from the temperature difference to be expected, and depending on the operating scenario is subject to a prediction inaccuracy of one or more ® C., which is why $T_{BL-y}$ is accordingly set below the desired target temperature $T_{BL-x}$. Above this temperature, the temperature input into the cuvette contents takes place purely by heat conduction between the cuvette block and the cuvette contents.

This has the advantage that the heating effect brought about by additionally introducing ultrasonic energy takes place at a time in the heating process at which the heating rate resulting from the conductive temperature input of the cuvette block has fallen to around half. It is therefore particularly efficient to add heat from this point onward, since a lower total energy has to be output by the ultrasonic emitter. The lifespan of the ultrasonic transducer and of any adhesion site is increased as a result.

6) (as example 1) Reaching a target temperature $T_{BL-x}$ which is lower than the temperature of the cuvette block by the value x, where x is for example at a specified value of 0.1-1° C., preferably 0.1-0.5° C. The target temperature is fixed, and in the example shown is between 36.5 and 37.5° C. The temperature constancy throughout the duration of a subsequent optical measurement of an analyte concentration should be around 0.1° C.

In specific mixing tasks, a mixing of two or more liquids that have been individually introduced into one of the cuvettes 201 may in some cases not take place with sufficient mixing quality or mixing speed if the mixing takes place exclusively via the introduced ultrasonic energy from an external ultrasonic transducer, such as for example the ultrasonic transducer 840 attached to the cuvette 201.

By way of example, the reagent liquids to be mixed, which have been introduced into one of the cuvettes 201, may have a high viscosity and/or a large density difference, as a result of which the mixing in a cuvette 201, to which ultrasound is applied, is made more difficult. Typical examples of this are reagent solutions or buffer solutions which contain polyethylene glycol and/or which are very concentrated, which are introduced into a cuvette for mixing purposes. (The liquids may be introduced for example by way of a known x-y-z laboratory robot with an automatic pipettor.)

To solve this problem, it has proven to be particularly advantageous 1) to remove again, by means of the pipettor, at least a portion of the liquid volume that has already been introduced into the cuvette 201,
2) and to re-introduce it into the cuvette 201,
3) then to apply ultrasound to the cuvette contents in order to achieve complete mixing.

Steps 1) and 2) may optionally be repeated multiple times.

Furthermore, the ultrasonic mixing through application of ultrasound may already start before or during step 1) and 2) and may take place continuously or discontinuously, but in any event after a sequence of steps 1) and 2).

Example of a Mixing Process in the Context of Preparing to Measure an Analyte Concentration in a Sample to be Analyzed:

1) pipette 2-10 μl of sample (for example plasma) into the cuvette 201
2) pipette 150-180 μl of a first reagent solution of a first reagent in a polyethylene glycol-based solvent into the cuvette 201
3) pipette 40 μl of a second reagent solution of a second reagent in aqueous solution into the cuvette 201
4) reaspirate 50 μl of the liquid volume that has already been pipetted into the cuvette, and redispense the reaspirated liquid volume into the cuvette 201
5) repeat step 3) and 4)
6) operate the ultrasonic transducer 840 for a defined duration

The invention claimed is:

1. A method for mixing and controlling the temperature of liquid media which are introduced into lined-up cuvettes of a cuvette array in order to determine analytes, wherein the cuvettes of the cuvette array are arranged in a form-fitting manner in receptacles of a cuvette block which is temperature-controlled to a block temperature ($T_{BL}$), the method comprising the following steps:

regulating the temperature of the cuvette block to the block temperature ($T_{BL}$), heating the empty cuvettes to a predefinable target temperature of 25 to 42° C. by heat conduction from the temperature-controlled cuvette block, the block temperature ($T_{BL}$) of which is 0.1 to 1° C. above the target temperature, adding one or more liquid media having a temperature lower than the target temperature into at least one of the cuvettes, wherein the liquid media in the cuvette have an initial temperature ($T_0$) below the target temperature, heating the liquid media through heat conduction from the temperature-controlled cuvette block in order to reach the predefined target temperature, in the phase of heating by heat conduction, before the target temperature is reached, additionally introducing a predetermined quantity of ultrasonic energy by means of at least one ultrasonic transducer attached to each cuvette in order to increase the rate of heating, and simultaneously mixing the liquid media by means of the ultrasonic energy.

2. The method according to claim 1, wherein a proportion of at least 30% of the total quantity of ultrasonic energy is introduced above a temperature of $0.5\times(T_{BL}-T_0)$.

3. The method according to claim 1, wherein the ultrasonic energy is introduced into the liquid media in a pulsed manner in multiple boosts.

4. The method according to claim 1, wherein the quantity of ultrasonic energy is determined as a function of parameter values of the liquid media added in point b), such as quantity, heat capacity, viscosity, thermal conductivity and temperature.

5. The method according to claim 1, wherein at least one boost of the ultrasonic energy is optimized in terms of the pulse duration, the frequency and the amplitude in order to mix the liquid media in the cuvette.

6. The method according to claim 1, wherein the ultrasonic transducer is a thickness-mode transducer, and is operated at a fundamental frequency of approximately 0.5 MHz to 10 MHz.

7. The method according to claim 1, wherein the ultrasonic transducer is an interdigital transducer, and is operated at a fundamental frequency of approximately 50 MHz to 150 MHz.

8. The method according to claim 6, wherein a modulation frequency having an amplitude of 1 to 100 Hz is impressed on the fundamental frequency of the ultrasonic transducer.

9. The method according to claim 1, wherein in order to assist the mixing process, at least a portion of the liquid volume introduced into the cuvette is aspirated and dispensed back into the cuvette at least once.

10. The method according to claim 1, further including the step of continuously measuring an optical signal from the contents of the cuvette, and the mixing process is terminated as soon as a stable signal is obtained.

11. A device for mixing and controlling the temperature of liquid media which are introduced into lined-up cuvettes of a cuvette array in order to determine analytes, wherein the device comprises a cuvette block with form-fitting receptacles for the cuvettes, said cuvette block being regulated to a predefinable block temperature ($T_{BL}$), wherein the cuvette block is equipped with a temperature control device and is in thermal contact with the individual cuvettes, at least one ultrasonic transducer is attached to each cuvette in order to introduce ultrasonic energy into the cuvettes, and wherein the ultrasonic transducer is a piezoelectric vibrator and is communicatively connected to a control unit configured and arranged to actuate the at least one ultrasonic transducer as a function of parameter values of the liquid media;

a control unit for controlling the ultrasonic transducer such that the liquid in the cuvettes is heated and is constantly circulated at the same time.

12. The device according to claim 11, wherein the temperature control device includes a cooling and heating device.

13. The device according to claim 11, wherein the cuvette block includes a base part which contains the form-fitting receptacles for the cuvettes, and a front part which configured and arranged to be detached from the base part in order to remove the cuvettes.

14. The method of claim 1, wherein the step of heating the empty cuvettes further includes heating the empty cuvettes to a predefinable target temperature of 36.5 to 37.5° C.

15. The method of claim 2, wherein a proportion of at least 50%, of the total quantity of ultrasonic energy is introduced above a temperature $0.5\times(T_{BL}-T_0)$.

16. The method of claim 10, wherein the contents of the cuvette are a sample/reagent mixture.

17. The device of claim 12, wherein the cooling and heating device is at least one Peltier element.

* * * * *